United States Patent
Kolathur et al.

(10) Patent No.: US 9,058,184 B2
(45) Date of Patent: Jun. 16, 2015

(54) RUN TIME GENERATION AND FUNCTIONALITY VALIDATION OF DEVICE DRIVERS

(71) Applicant: Vayavya Labs Private Limited, Belgaum (IN)

(72) Inventors: Venugopal Kolathur, Belgaum (IN); Ravindragouda Kalagouda Patil, Belgaum (IN); Parag Naik, Bangalore (IN)

( * ) Notice: Subject to any disclaimer, the term of this patent is extended or adjusted under 35 U.S.C. 154(b) by 13 days.

(21) Appl. No.: 14/026,270

(22) Filed: Sep. 13, 2013

(65) Prior Publication Data

US 2014/0075053 A1    Mar. 13, 2014

(30) Foreign Application Priority Data

Sep. 13, 2012 (IN) .......................... 3793/CHE/2012

(51) Int. Cl.
| | |
|---|---|
| G06F 3/00 | (2006.01) |
| G06F 13/28 | (2006.01) |
| G06F 5/00 | (2006.01) |
| G06F 13/00 | (2006.01) |
| G06F 9/44 | (2006.01) |
| G06F 9/45 | (2006.01) |
| G06F 11/36 | (2006.01) |

(52) U.S. Cl.
CPC .............. G06F 9/4411 (2013.01); G06F 8/447 (2013.01); G06F 11/3672 (2013.01)

(58) Field of Classification Search
CPC ...... G06F 3/0639; G06F 3/1254; G06F 9/445
USPC .................................. 710/10, 16, 26, 54, 104
See application file for complete search history.

(56) References Cited

U.S. PATENT DOCUMENTS

| | | | | |
|---|---|---|---|---|
| 2003/0149753 | A1* | 8/2003 | Lamb | 709/223 |
| 2004/0003135 | A1* | 1/2004 | Moore | 709/321 |
| 2004/0123305 | A1* | 6/2004 | Kim et al. | 719/321 |
| 2007/0088890 | A1* | 4/2007 | Wieland et al. | 710/269 |
| 2010/0169512 | A1* | 7/2010 | Matton et al. | 710/16 |
| 2011/0283025 | A1* | 11/2011 | Maxwell et al. | 710/16 |

* cited by examiner

*Primary Examiner* — Ernest Unelus
*Assistant Examiner* — Getente A Yimer
(74) *Attorney, Agent, or Firm* — The Law Office of Austin Bonderer, PC

(57) ABSTRACT

A method of generating and validating a device driver for a hardware device is provided. The method include (i) dynamically querying the hardware device for a device programming specification, (ii) dynamically querying a run time environment for a run time specification, (iii) obtaining the device programming specification that is specific to the hardware device, (iv) obtaining the run time specification that is specific to the hardware device and the run time environment, (v) dynamically synthesizing a device driver, by a device driver generation tool to obtain a synthesized device driver, (vi) automatically testing, by the device driver generation tool, the synthesized device driver based on a device class of the hardware device, and (vii) automatically evaluating, by the device driver generation tool, a performance of the synthesized driver with respect to standard performance parameters for the device class of the hardware device for validating the synthesized device driver.

19 Claims, 9 Drawing Sheets

RUN TIME GENERATION AND FUNCTIONALITY VALIDATION OF DEVICE DRIVERS

CROSS-REFERENCE TO RELATED APPLICATIONS

This application claims priority to Indian patent application no. 3793/CHE/2012 filed on Sep. 13, 2013, the complete disclosure of which, in its entirely, is herein incorporated by reference.

BACKGROUND

1. Technical Field

The embodiments herein generally relate to device driver generation for a hardware device, and, more particularly, to a run time generation and functionality validation of device drivers using a high level descriptions of the hardware device and software environment that embedded in the hardware device and a run time environment.

2. Description of the Related Art

Typically any software running on a hardware/platform exercises the features of the hardware by way of device drivers. A device driver generally refers to a software code (group of software instructions), which enables a computing device (e.g., a computer system) to interface with a hardware device (e.g., a printer, a modem, a network controller card, etc.). The device driver provides appropriate interfaces enabling various software modules (e.g., user applications, operating system components, etc.) executing in the computing device (or hardware components in the computing device) to communicate with and/or to control the hardware device.

Device driver code is different for different computing devices generally due to differences in hardware and software characteristics among computing devices. For example, different operating systems (or its absence) may require different software codes for operation as a device driver in the corresponding computing devices. Similarly, having different hardware (devices, registers, etc.) characteristics may also require different software codes.

Device driver for a device is usually provided by one of the following means (i) sometimes written as part of applications, (ii) supplied as a standard component of an Operating System, (iii) written as a software component by a developer when he/she has a reference hardware platform and the run time environment. Typically, device driver writers use the description of the device features that are usually provided in English. This leads to ambiguity which results in quite a few to and fro between the hardware and software developers. There are a large number of combinations of different computing devices and operating environments (hardware and software characteristics). Since the information needed to write a device driver for a specific hardware device and/or operating system typically has to be obtained manually, it is cumbersome to write device drivers for these various combinations.

SUMMARY

In view of the foregoing, an embodiment herein provides a method of generating and validating a device driver for a hardware device. The method includes (i) dynamically querying the hardware device for a device programming specification, (ii) dynamically querying a run time environment for a run time specification, (iii) obtaining the device programming specification that is specific to the hardware device, (iv) obtaining the run time specification that is specific to the hardware device and the run time environment, (v) dynamically synthesizing a device driver by a device driver generation tool to obtain a synthesized device driver, (vi) automatically testing by the device driver generation tool the synthesized device driver by the device driver generation tool based on a device class of the hardware device, and (vii) automatically evaluating a performance of the synthesized driver with respect to standard performance parameters for the device class of the hardware device for validating the synthesized device driver. The device driver is specific to the hardware device and is generated based on the device programming specification and the run time specification.

The method may further include regenerating the synthesized device driver until no further errors are detected. The method may further include evaluating a quality of the synthesized device driver based on at least one of (a) a size of instructions associated with the device programming specification and the run time specification, and (b) a performance of the instructions. The method may further include generating a quality report of the synthesized device driver that is specific to the hardware device. The device programming specification may be stored in the hardware device and the run time specification may be stored in the run time environment of the computing device.

The method may further include obtaining a device obtaining a storage location of (a) the device programming specification based on the device ID and the vendor ID that is specific to the hardware device, and (b) the run time specification based on the hardware device and the run time environment. The method may further include obtaining (a) the device programming specification, and (b) the run time specification from an external storage device that is communicating with the computing device.

The method may further include providing at least one uniform resource locator for downloading the device programming specification. The device programming specification and the run time specification may be stored in at least one of (i) the computing device, (ii) the external storage device that is connected to the computing device, and (iii) a remote server that is in communication with the computing device.

In another aspect, a system for generating and validating a device driver for a hardware device is provided. The system include a computing device that include (a) at least one of (i) an operating system and (ii) a run time environment, (b) a device driver generation tool that generates the device driver for the hardware device, (c) a memory unit that stores (a) a database, and (b) a set of instructions, and (d) a processor that executes the set of instructions include (i) dynamically querying the hardware device for a device programming specification, (i) dynamically querying the run time environment for a run time specification, (iii) obtaining the device programming specification that is specific to the hardware device, (iv) obtaining the run time specification that is specific to the hardware device and the run time environment, (v) dynamically synthesizing a device driver by the device driver generation tool to obtain a synthesized device driver, (vi) automatically testing, by the device driver generation tool, the synthesized device driver based on a device class of the hardware device, and (vii) automatically evaluating, by the device driver generation tool, a performance of the synthesized driver with respect to standard performance parameters for the device class of the hardware device for validating the synthesized device driver.

The device driver is specific to the hardware device and is generated based on the device programming specification and the run time specification. The set of instructions may further include regenerating the synthesized device driver until no further errors are detected. The set of instructions may further include evaluating a quality of the synthesized device driver based on at least one of (a) a size of instructions associated with the device programming specification and the run time specification, and (b) a performance of the instructions. The set of instructions may further include generating a quality report of the synthesized device driver that is specific to the hardware device. The device programming specification may be stored in the hardware device and the run time specification may be stored in the run time environment of the computing device. The set of instructions may further include obtaining a storage location of (a) the device programming specification based on a device ID and a vendor ID that is specific to the hardware device which is obtained from a configuration file, and (b) the run time specification based on the hardware device and the run time environment.

The set of instructions may further include obtaining (a) the device programming specification, and (b) the run time specification from an external storage device that is communicating with the computing device. The set of instructions may further include providing at least one uniform resource locator for downloading the device programming specification. The device programming specification and the run time specification may be stored in at least one of (i) the computing device, (ii) the external storage device that is connected to the computing device, and (iii) a remote server that is in communication with the computing device.

In yet another aspect, a method of generating and validating a device driver for a hardware device is provided. The method include (i) activating a boot code for a computing device, (ii) obtaining (a) information associated with at least one hardware device that is connected to the computing device, and (b) information associated with a hardware device for which a device driver is not present in the run time environment, (iii) obtaining a device ID, and a vendor ID from a configuration file, (iv) obtaining a storage location of (a) a device programming specification, and (b) a run time specification, (v) dynamically querying (i) the hardware device for the device programming specification, and (ii) the run time environment for the run time specification, (vi) obtaining the device programming specification that is specific to the hardware device, (vii) obtaining the run time specification that is specific to the hardware device, (viii) dynamically synthesizing a device driver to obtain a synthesized device driver, (ix) testing the synthesized device driver based on a device class of the hardware device, and (x) evaluating a performance of the synthesized driver with respect to standard performance parameters for the device class of the hardware device for validating the synthesized device driver. The computing device includes at least one of (i) an operating system, and (ii) a run time environment. The device driver is specific to the hardware device and is generated based on the device programming specification and the run time specification.

In further aspect, an embodiment herein provides a method of generating and validating a device driver for a hardware device. The method includes (i) dynamically querying the hardware device for a device programming specification, (ii) dynamically querying a run time environment for a run time specification, (iii) obtaining the device programming specification that is specific to the hardware device, (iv) obtaining the run time specification that is specific to the hardware device and the run time environment, and (v) dynamically synthesizing a device driver by a device driver generation tool to obtain a synthesized device driver.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1A:
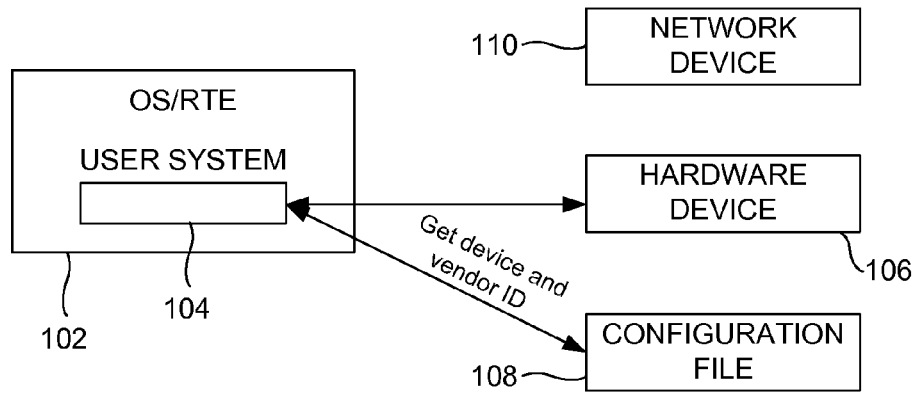
FIG. 1A through FIG. 1C illustrates a block diagram for generating a device driver for an existing hardware device according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a device driver generation tool to generate a device driver and test the device driver for functionality on the go using a high level description of a hardware device and software environment embedded in the hardware device. The embodiments herein achieve this by providing a device driver generation tool generates, synthesizes and deploys the device driver. During the synthesis-deployment phase, the device driver is validated by attempting for auto-correction to identify and fix the errors. The ability of the device driver generation tool to attempt for auto-correction eliminates, to some basic level the need of user intervention to correct any errors. The device driver generation tool further generates report indicating a quality of the device driver. The user gets user manual regarding the APIs provided by the device driver thus helping out in application development. This tool eases the process both in terms of effort and time for porting operating systems on a platform since now the porting has to be done only for the processor and all the drivers will be automatically generated. Referring now to the drawings, and more particularly to FIG. 1A through FIG. 7, where similar reference characters denote corresponding features consistently throughout the figures, there are shown preferred embodiments.

Figure 1B:
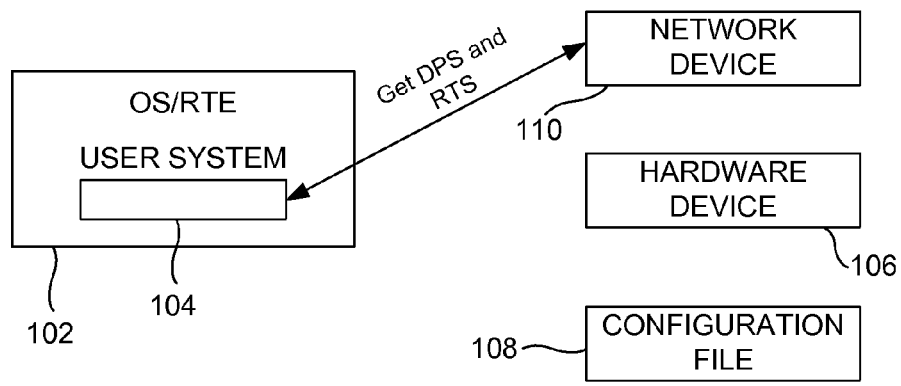
Figure 1C:
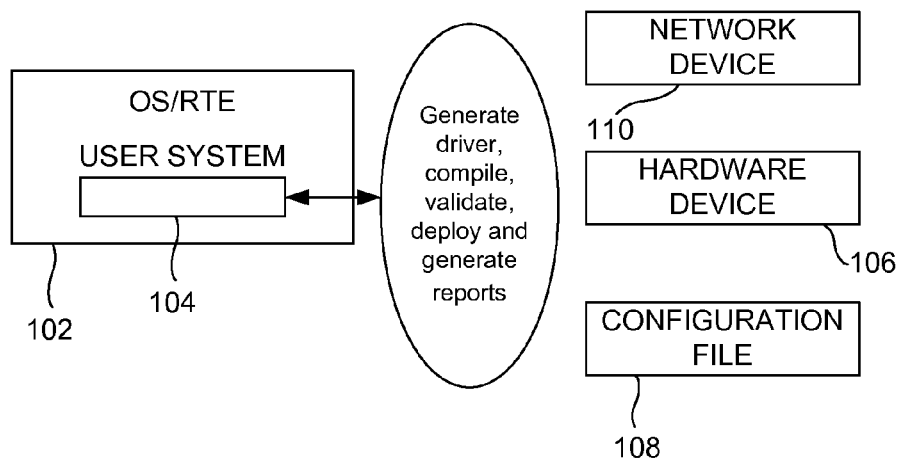

FIG. 1A through FIG. 1C illustrates a block diagram for generating a device driver for an existing hardware device (which is not the primary network device of the computing device) according to an embodiment herein. The block diagram includes a computing device 102 having a device driver generation tool 104, the hardware device 106 having a configuration file 108, and a network device 110. The hardware device 106 is not a primary network device, in one example embodiment. The computing device 102 has an operating system or a run time environment (RTE). The DPS is not embedded in the hardware device 106 and the RTS is not present in the operating system (e.g., the run time environment (RTE)), in one example embodiment. The user provides a configuration file that includes a device ID and a vendor ID. The device driver generation tool 104 reads the configuration file (as shown in FIG. 1A) and downloads an appropriate device programming specification (DPS) and run time specification (RTS) from the external storage as shown in FIG. 1B. The external storage may be on a dedicated server, or stored on a cloud, or on an external hard disk, in one example. In one embodiment, the computing device 102 may be a smart phone, a tablet PC, a laptop, a desktop, and an ultra-book. The device driver generation tool 104 then generates the device driver for the existing hardware device, validates, deploys the device driver and generates reports as shown in FIG. 1C.

Figure 2A:
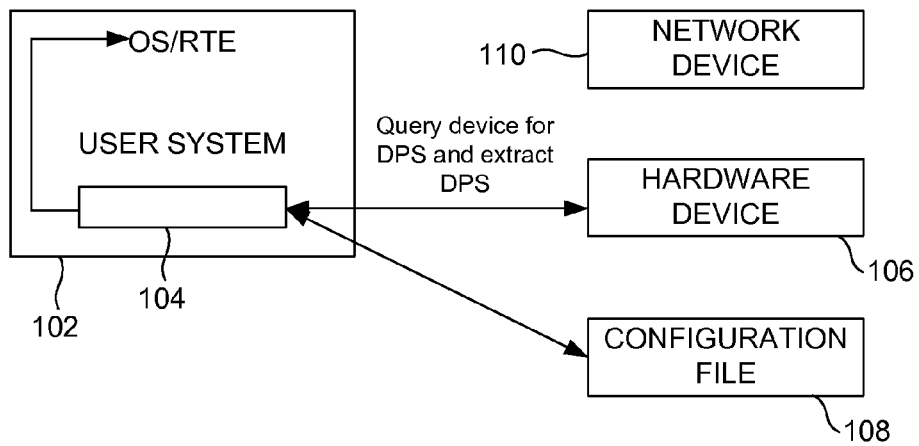
FIG. 2A through FIG. 2C illustrates a block diagram for generating a device driver for the existing hardware device when the device programming specification is in the hardware device and a run time specification is in a run time environment of the computing device of FIG. 1A-1C according to an embodiment herein.
Figure 2B:
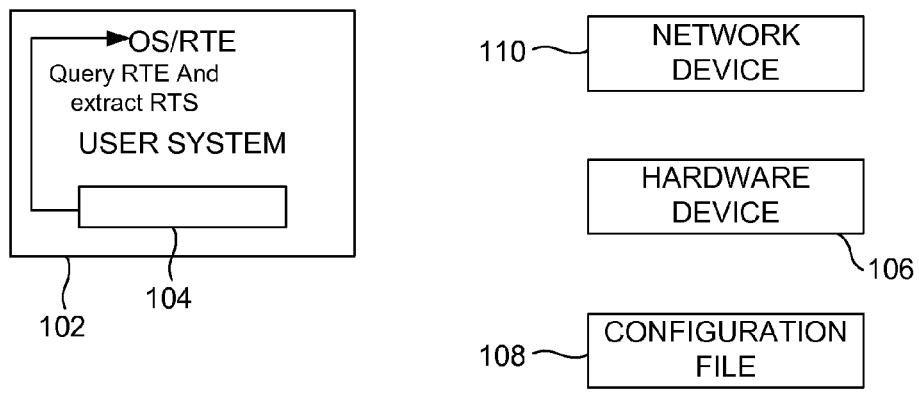
Figure 2C:
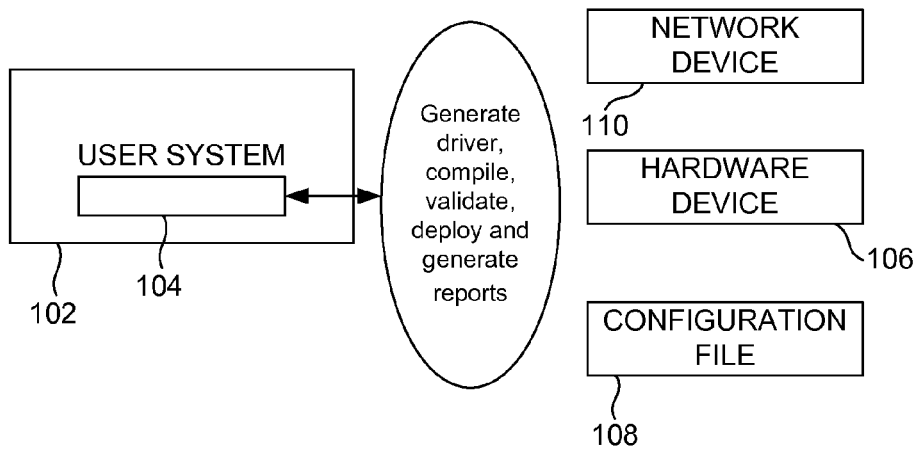

FIG. 2A through FIG. 2C illustrates a block diagram for generating a device driver for the existing hardware device when the DPS is in the hardware device 106 and the RTS is in the RTE of the computing device 102 of FIG. 1A-1C according to an embodiment herein. The device driver generation tool 104 receives a device programming specification (embedded in the hardware device 106) by querying the hardware device 106 in one embodiment. For example, the device programming specification (DPS) is embedded in the hardware device 106 when the hardware device 106 provides an internal memory and one or more registers with one or more byte size each at predefined locations.

In one embodiment, the hardware device 106 provides approximately 50 KB internal memory, three registers of 4 bytes size each at offset 0, 4 and 8. The register at location 0 may have 0x766C616273 as a default value. The register at the offset 4 may have a size of the DPS file that is stored in the hardware device memory and then the register at offset 8 provide access to the internal memory containing a compressed version of DPS. In an example embodiment, when the device driver generation tool 104 may first read register at offset 0 of the hardware device. If the value read is 0x766C616273, the device driver generation tool 104 may read the value stored in the register at offset 4 to determine number of byte to be read for obtaining a complete DPS stored in the internal memory of the hardware device. The device driver generation tool 104 may proceed to read the number of bytes read from register at offset 8. The device driver generation tool 104 may proceed to decrypt and uncompressed DPS may be generated.

Similarly, the device driver generation tool 104 receives the run time specification (embedded in the run time environment that is executed on the computing device 102) by querying the run time environment installed on the computing device 102. In one embodiment, the run time specification may be embedded (e.g., stored or bundled) within the runtime environment (e.g., an operating system) during the production process. For example, The operating system may have a specific directory at a root level of a file system (e.g., In case of A1 operating system is C:\ABC and in case of A2 operating system is C:\XYZ). The device driver generation tool 104 may consider a device id (either by querying the hardware device 106 or by obtaining information from a configuration file). The device driver generation tool 104 searches the ABC folder to check if an RTS corresponding to the device id is present in the directory. If the RTS is present the device driver generation tool 104 may proceed to uncompress it. If the RTS is not present the device driver generation tool 104 may proceed to obtain from the internet (either from a server or from the cloud) and uncompress it.

This scenario enables an end user (e.g., a customer or a person of ordinary skill in the art) to generate a device driver for the hardware device 106 using the device driver generation tool 104 (which may be executed in the computing device 102). This further eliminates the need of downloading the device driver from the internet. For example, The device driver generation tool 104 queries the hardware device 106 for the DPS and extracts the DPS from the hardware device as shown in FIG. 2A. Similarly, the device driver generation tool 104 queries the run time environment (RTE) and extracts the run time specification (RTS) from the run time environment (RTE) as shown in FIG. 2B. The device driver generation tool 104 then generates the device driver for the existing hardware device, validates, deploys the device driver and generates reports as shown in FIG. 2C.

Figure 3A:
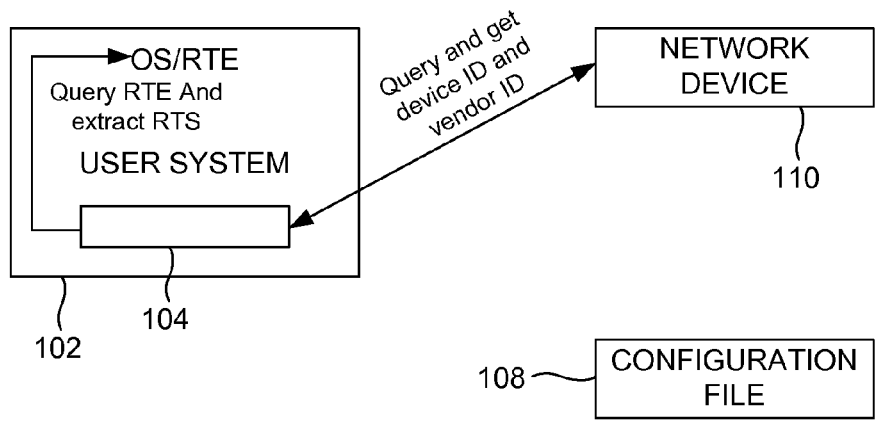
FIG. 3A through FIG. 3C illustrates a block diagram for generating a device driver for the primary network device of FIG. 1A-1C when the device programming specification is not available for the network device according to an embodiment herein; and FIG. 4A through FIG. 4C is a flow chart illustrating a method of generating a device driver for the hardware device and testing the device driver for functionality on the computing device using the device driver generation tool of FIG. 1A-1C according to an embodiment herein.
Figure 3B:
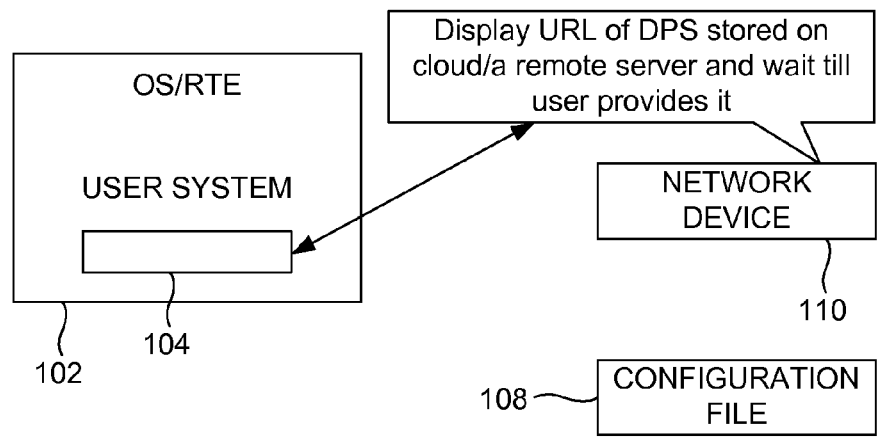
Figure 3C:
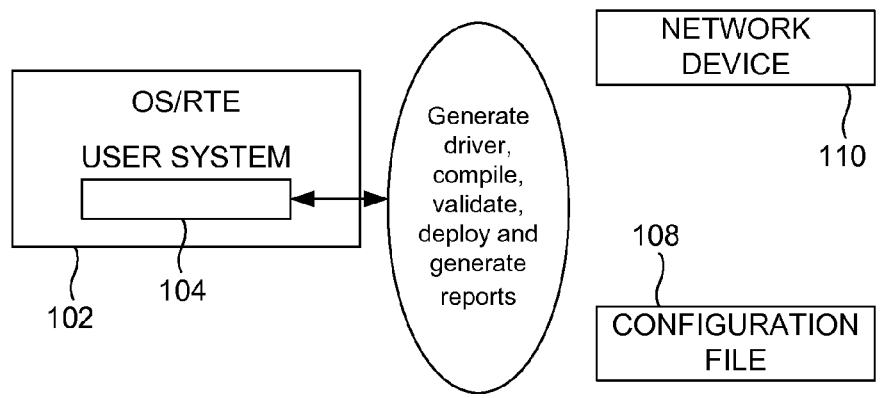

FIG. 3A through FIG. 3C illustrates a block diagram for generating a device driver for the primary network device 110 of FIG. 1A-1C when the DPS is not available for the network device 110 according to an embodiment herein. In one embodiment, the device driver generation tool 104 queries the network device 110 to obtain the device ID and vendor ID as shown in FIG. 3A. For example, the network device 110 is a primary network device of the computing device 102. Hence, the device driver generation tool 104 cannot access and use the network device 110 to obtain the DPS. However, one or more URLs are displayed to the user from which the DPS can be downloaded. The URL of the DPS stored on a remote server is displayed to the user as shown in FIG. 3B. The device driver generation tool 104 waits until the user provides the target location for the DPS. Similarly, the device driver generation tool queries the RTE for the RTS as shown in FIG. 3A. Upon obtaining the DPS and the RTS, the device driver generation tool 104 then generates the device driver for the network device 110, validates, deploys the device driver and generates reports.

Figure 4A:
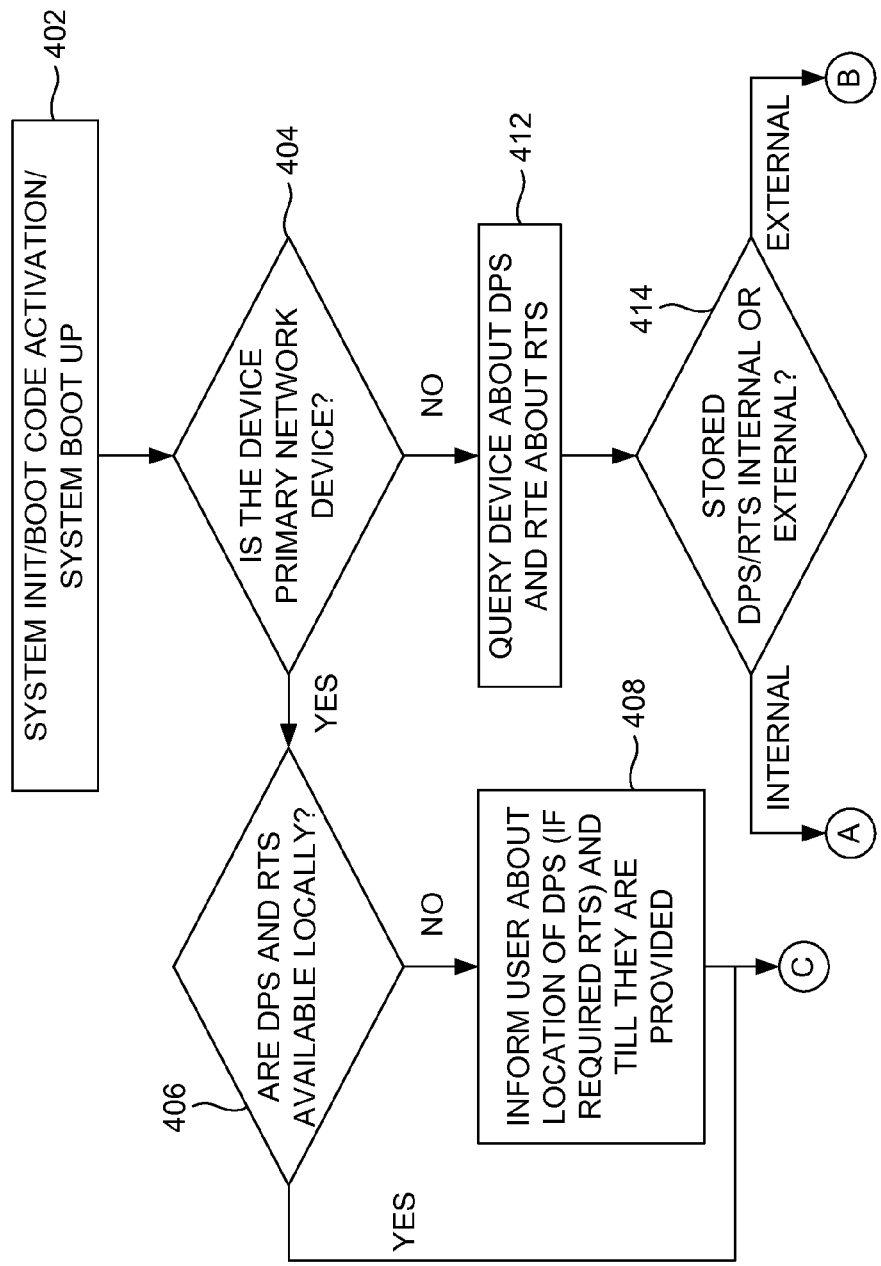
Figure 4B:
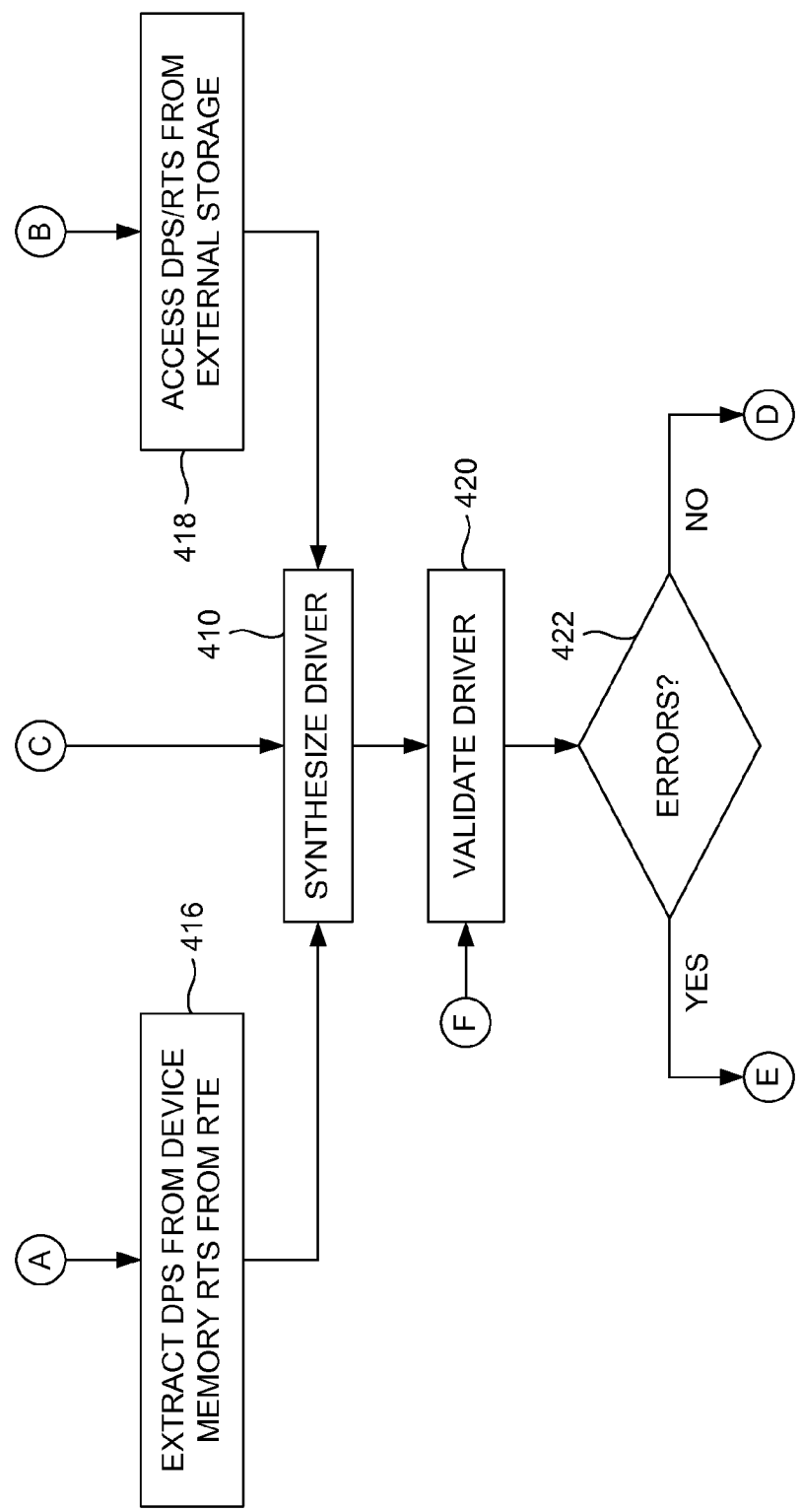
Figure 4C:
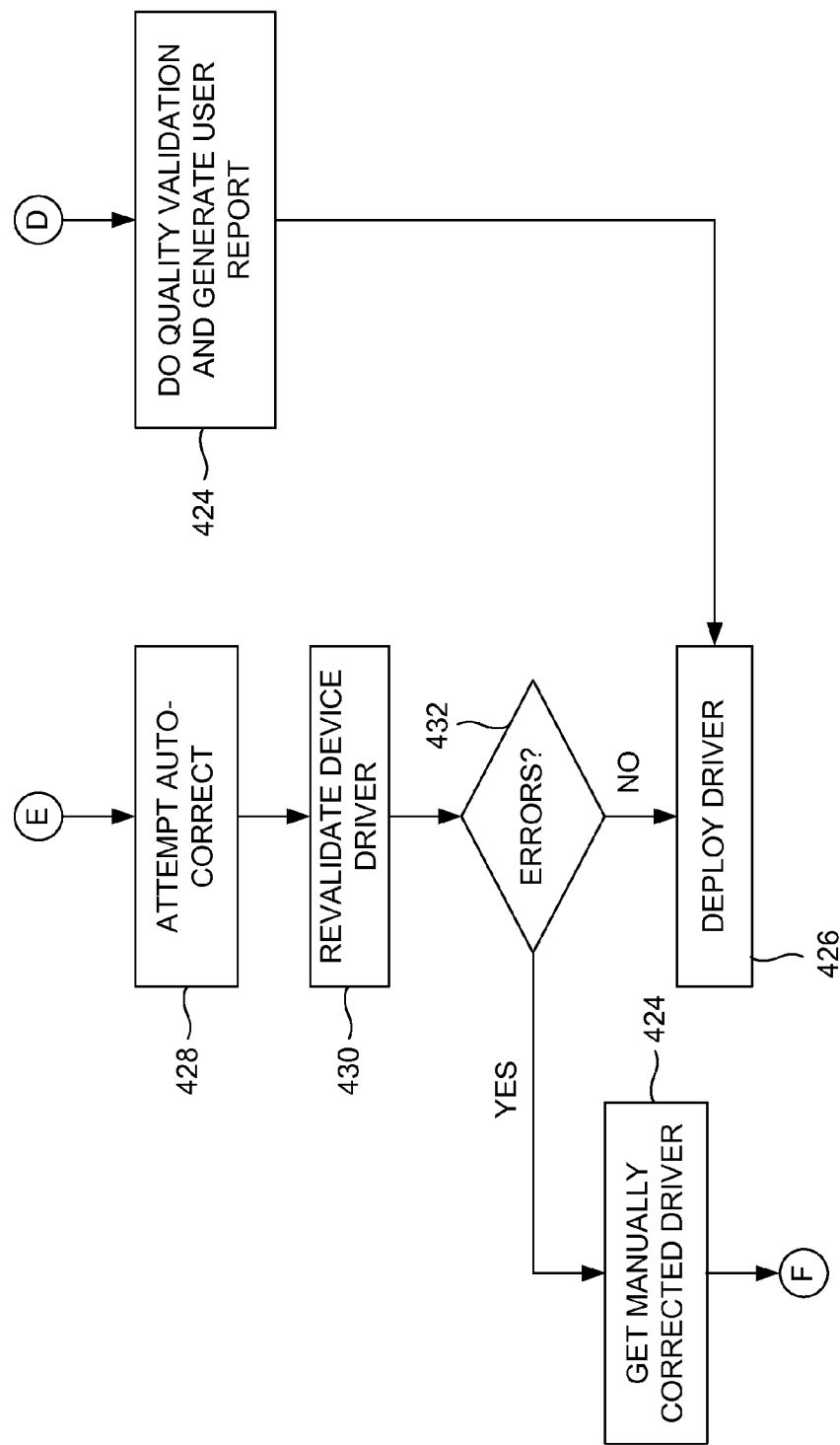

FIG. 4A through FIG. 4C is a flow chart illustrating a method of generating a device driver for a hardware device and testing the device driver for functionality on the computing device 102 using the device driver generation tool 104 of FIG. 1A-1C according to an embodiment herein. In step 402, boot code for a computing device is activated. In step 404, check whether the hardware device is a primary network device. If the hardware device is the primary network device, then it is checked whether a device program specification (DPS) and a run time specification (RTS) are available locally on the computing device 102, in step 406. If the DPS and the RTS are not available locally on the computing device 102, a user associated with the computing device 102 is informed about the location of the DPS (and if required RTS), in step 408. In one embodiment, the device driver generation tool prompts the user the location of the DPS and the RTS and how to obtain the externally stored DPS and/or RTS.

In step 410, the device driver is generated and synthesized for the hardware device based on the DPS and the RTS. In one embodiment, the device driver generation tool 104 dynamically synthesis the device driver by detecting and querying of the hardware device after RTE/Operating system boot up. If the DPS and RTS are available locally, then the device driver is generated and synthesized for the hardware device based on the DPS and the RTS without having to perform the step 408.

If the hardware device is not the primary network device, then the DPS are queried in the hardware device 106 and the RTS are queried in the run time environment (RTE) 104, in step 412. In one embodiment, then the DPS and the RTS are dynamically queried for in the hardware device and in the run time environment (RTE) respectively. In step 414, it is checked whether the DPS and the RTS are stored (i) internally in the hardware device or (ii) externally on a storage device or on a remote server. If the DPS and the RTS are stored internally in the hardware device, the DPS and the RTS are extracted in step 416, and the step 410 is performed. If the DPS and/or the RTS are stored externally on the storage device or on the remote server, then the DPS and/or the RTS are accessed from the storage device or from the remote server in step 418, and the step 410 is performed.

In step 420, the device driver is validated. In one embodiment, validation of the synthesized device driver is performed when the synthesized device driver is executed on the hardware device. In one embodiment, the device driver generation tool 104 automatically validates the functionality of the synthesized device driver by executing it on the hardware device 106 to detect possible defects, evaluates the device driver qualitatively in terms of size of code, performance of the code etc., and performs a conformance test to ensure that the device driver adheres to the conformance criteria as required by the RTE/Operating system like that of WHQL.

In step 422, it is checked whether there are any errors in the device driver. If there are no errors in the device driver, then a quality check is performed and a report is generated in step 424. The report helps the application writer in using the device driver by providing information about the APIs provided by the device driver. In step 426, the device driver is deployed. If there are errors in the device driver, the device driver generation tool attempts for auto-correction, in step 428. In step 430, the device driver generation tool revalidates the device driver after performing auto-correction. In one embodiment, in case of error detection during validation, the device driver generation tool 104 attempts for automatic error correction using standard observation debug points that have been already inserted in the hardware device.

In step 432, it is checked whether there are any more errors in the device driver. If there are no errors in the device driver then the step 426 is performed. Else, if there are errors, the device driver may be manually corrected in step 434, and the step 420 may be performed. In one embodiment, if the device driver generation tool 104 detects any problems during the validation phase, it will attempt to correct the problems and report the pass or failure of the device driver generation process. Based on this report, the user can then attempt to do any manual corrections and re-run the device driver generation tool 104 based on a request received and/or displayed on a display of the computing device 102 by the device driver generation tool 104.

Figure 5:
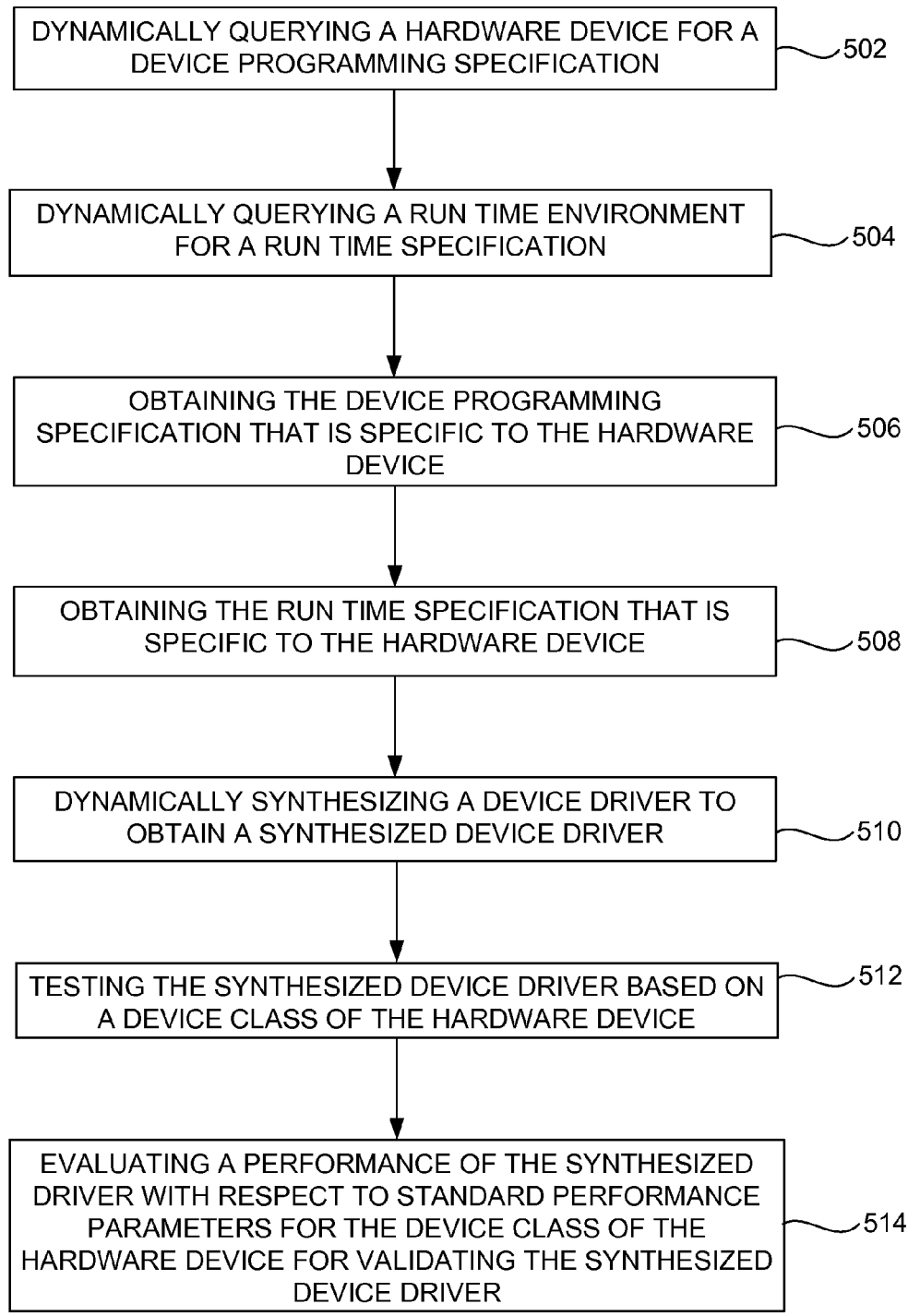
FIG. 5 is a flow chart illustrating a method of generating a device driver for the hardware device and testing the device driver for functionality on the computing device using the device driver generation tool of FIG. 1A-1C according to an embodiment herein.

FIG. 5 is a flow chart illustrating a method of generating a device driver for the hardware device and testing the device driver for functionality on the computing device using the device driver generation tool of FIG. 1A-1C according to an embodiment herein. In step 502, a hardware device is dynamically queried for a device programming specification. In one embodiment, the device driver generation tool 104 queries the hardware device for the device programming specification. In step 504, a run time environment is dynamically queried for a run time specification. In one embodiment, the device driver generation tool 104 queries the run time environment for the run time specification. In step 506, the device programming specification that is specific to the hardware device is obtained. In step 508, the run time specification that is specific to the hardware device is obtained.

In step 510, a device driver is dynamically synthesized to obtain a synthesized device driver based on the device programming specification and the run time specification. In step 512, the synthesized device driver is tested based on a device class of the hardware device. For example, the synthesized device driver is deployed tested based on the device class (e.g., enumeration and file copy for USB memory storage device or ping for network device).

In step 514, a performance of the synthesized device driver is evaluated with respect to standard performance parameters for the device class of the hardware device for validating the synthesized device driver. For example, performance of the synthesized driver is evaluated using standard test suites and a report is generated. The report may include standard expected performance for each device class and version (USB 2.0 devices performance will be less that of USB 3.0 devices or in case of Ethernet cards a 100 Mbps device will performance will be less than that of a 1 Gbps device which in turn will perform worse than a 10 Gbps device. Hence the database may include expected performance for each and every variation. In one embodiment, standard size of device driver for different device classes may be stored and the size of the synthesized device driver may be compared against the standard expected device driver size stored in a database using a device class and a device id as key to search in the database.

In one embodiment, the synthesized device driver is regenerated until no further errors are detected. For example, when the test fails for the synthesized device driver, the synthesized device driver is regenerated with access to standard observation debug points (which are not usual device registers). The standard observation debug points may allow the driver access and display a actual signal values/status at various pins and buses in the computing device (what is the signal value at the interrupt pin(s) of the device?).

In one embodiment, a quality of the synthesized device driver is evaluated based on one or more (i) a size of instructions associated with the device programming specification and the run time specification, and (ii) performance of the instructions. In one embodiment, a quality report of the synthesized device driver that is specific to the hardware device is generated.

For example, the device programming specification is obtained from the hardware device and the run time specification is obtained from the run time environment of the computing device when the device programming specification is embed within the hardware device. Similarly, the run time specification is embed within the run time environment of the computing device.

In another example embodiment, a device ID and a vendor ID that is specific to the hardware device is obtained. A storage location of (a) the device programming specification, and (b) the run time specification is obtained based on the device ID and the vendor ID that is specific to the hardware device. Then automatically the device programming specification and (b) the run time specification are obtained from an external storage device that is communicating with the computing device.

In one embodiment, at least one uniform resource locator is provided for downloading the device programming specification. In one embodiment, the device programming specification and the run time specification are stored in at least one of (i) the computing device, (ii) an external storage device that is connected to the computing device, and (iii) a remote server that is in communication with the computing device.

Figure 6:
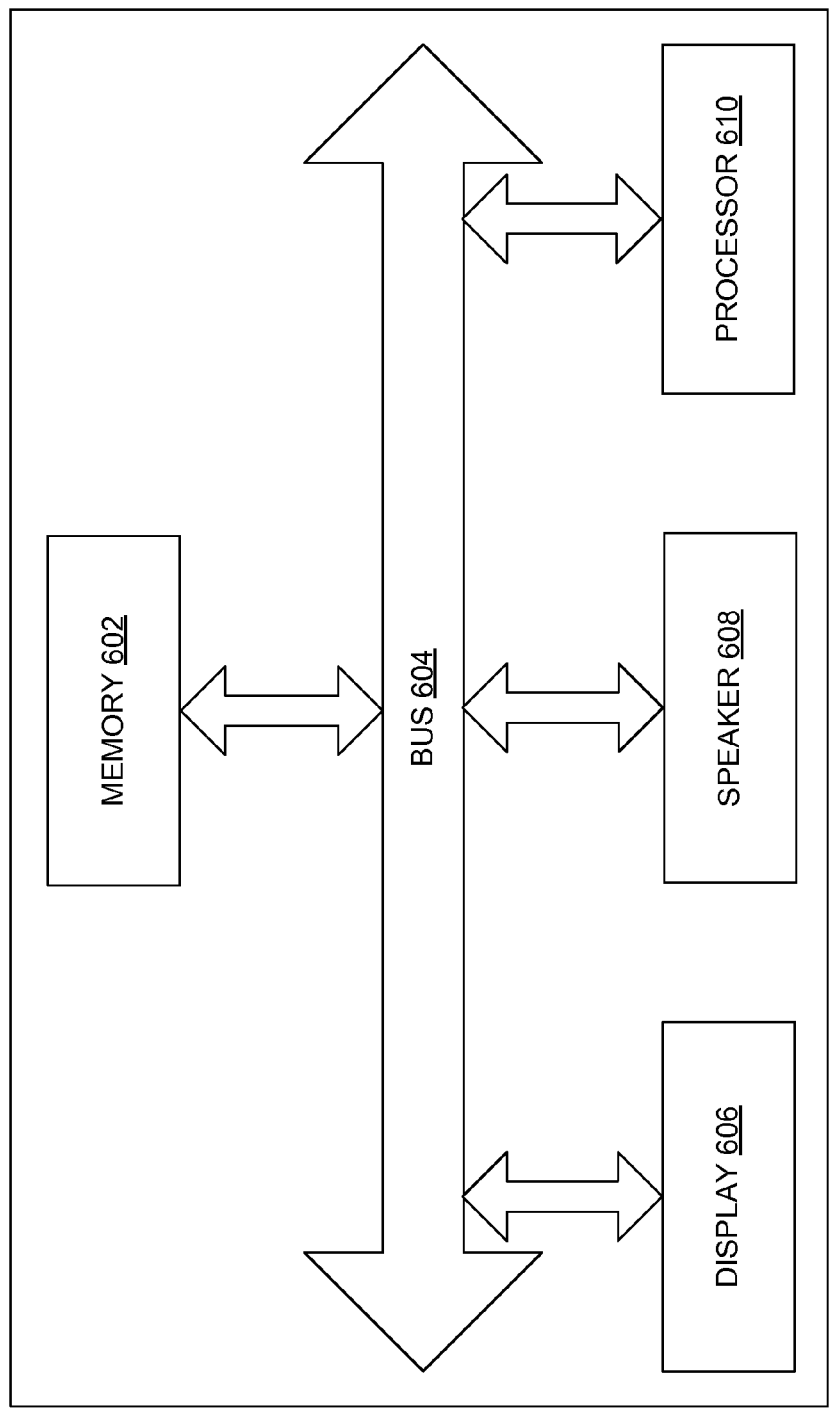
FIG. 6 illustrates a schematic diagram of the hardware device of FIG. 1A-1C to perform any one or more of the methodologies herein, according to an embodiment herein.

FIG. 6 illustrates a schematic diagram of the hardware device 106 of FIG. 1A-1C having an a memory 602 having a set of computer instructions, a bus 604, a display 606, a speaker 608, and a processor 610 capable of processing a set of instructions to perform any one or more of the methodologies herein, according to an embodiment herein. The processor 610 may also enable digital content to be consumed in the form of video for output via one or more displays 606 or audio for output via speaker and/or earphones 608. The processor 610 may also carry out the methods described herein and in accordance with the embodiments herein.

Digital content may also be stored in the memory 602 for future processing or consumption. The memory 6602 may also store program specific information and/or service information (PSI/SI), including information about digital content (e.g., the detected information bits) available in the future or stored from the past. A user of the hardware device 106 may view this stored information on display 606 and select an item of for viewing, listening, or other uses via input, which may take the form of keypad, scroll, or other input device(s) or combinations thereof. When digital content is selected, the processor 610 may pass information. The content and PSI/SI may be passed among functions within the hardware device 106 using the bus 604.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections).

In any case the chip is then integrated with other chips, discrete circuit elements, and/or other signal processing devices as part of either (a) an intermediate content, such as a motherboard, or (b) an end content. The end content can be any content that includes integrated circuit chips, ranging from toys and other low-end applications to advanced computer contents having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program content accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
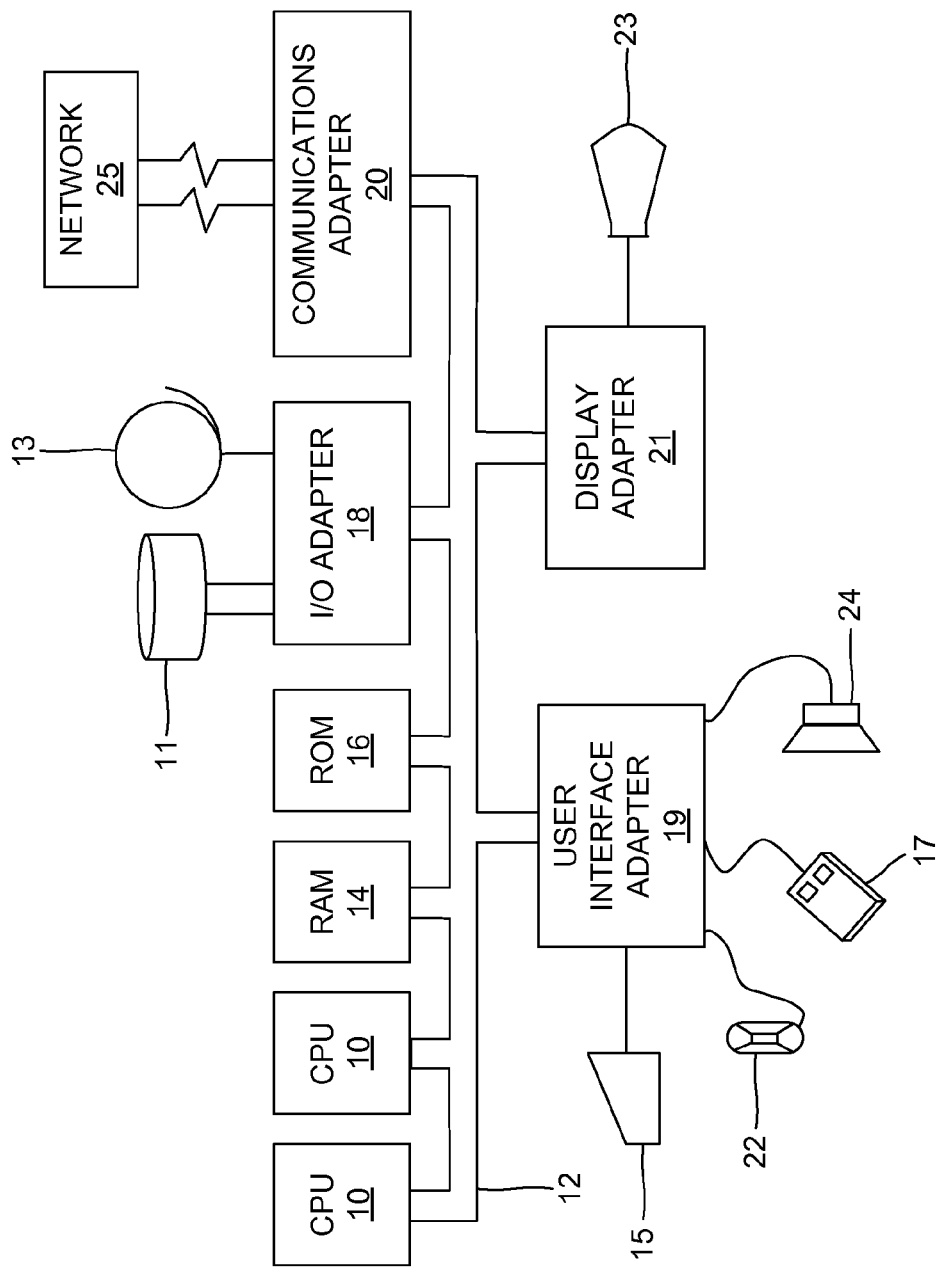
FIG. 7 illustrates a schematic diagram of a computer architecture used in accordance with the embodiments herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The device driver generation tool 104 eliminates the need to worry about getting driver written or synthesized externally by procuring a tool. When the RTE boots up automatically the driver gets synthesized and deployed. During the synthesis-deployment phase, the device driver generation tool 104 attempts auto-correction to fix any errors that are identified as part of device driver validation. The device programming specification (DPS) is embedded in the hardware device and the run time specification (RTS) is embedded in the run time environment. Hence, information needed for generating the device driver that is present in the operating system and in the hardware device. This scenario enables an end user (e.g., a customer or a person of ordinary skill in the art) to generate a device driver for the hardware device 106 using the device driver generation tool 104 (which may be executed in the computing device 102). This further eliminates the need of downloading the device driver from the internet. The ability of the device driver generation tool to attempt for auto-correction eliminates the need of user intervention to correct any errors or may provide an indication to manually correct the errors. The device driver generation tool further generates report indicating a quality of the device driver. The user gets user manual regarding the APIs provided by the device driver thus helping out in application development. This tool eases the process both in terms of effort and time for porting operating systems on a platform since now the porting has to be done only for the processor and all the drivers will be automatically generated.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of generating and validating a device driver for a hardware device, said method comprising:
    (i) dynamically querying said hardware device for a device programming specification;
    (ii) dynamically querying a run time environment for a run time specification;
    (iii) obtaining said device programming specification that is specific to said hardware device;
    (iv) obtaining said run time specification that is specific to said hardware device and said run time environment;
    (v) dynamically synthesizing a device driver, by a device driver generation tool to obtain a synthesized device driver, wherein said device driver is specific to said hardware device and is generated based on said device programming specification and said run time specification;
    (vi) automatically testing, by said device driver generation tool, said synthesized device driver based on a device class of said hardware device; and
    (vii) automatically evaluating, by said device driver generation tool, at least one of: a performance of said synthesized driver with respect to standard performance parameters for said device class of said hardware device for validating functionality of said synthesized device driver and a quality of said synthesized device driver based on at least one of (a) a size of instructions associated with said device programming specification and said run time specification, and (b) a performance of said instructions.

2. The method of claim 1, further comprising regenerating said synthesized device driver until no further errors are detected.

3. The method of claim 1, further comprising generating a quality report of said synthesized device driver that is specific to said hardware device.

4. The method of claim 1, wherein said device programming specification is stored in said hardware device, and wherein said run time specification is stored in said run time environment of said computing device.

5. The method of claim 1, further comprising obtaining a device ID and a vendor ID that is specific to said hardware device.

6. The method of claim 5, further comprising obtaining a storage location of (a) said device programming specification based on said device ID and said vendor ID that is specific to said hardware device, and (b) said run time specification based on said hardware device and said run time environment.

7. The method of claim 6, further comprising obtaining (a) said device programming specification, and (b) said run time specification from an external storage device that is communicating with said computing device.

8. The method of claim 1, further comprising providing at least one uniform resource locator for downloading said device programming specification.

9. The method of claim 1, wherein said device programming specification and said run time specification are stored in at least one of (i) said computing device, (ii) said external storage device that is connected to said computing device, and (iii) a remote server that is in communication with said computing device.

10. A system for generating and validating a device driver for a hardware device, said system comprising:
    (i) a computing device that comprises (a) at least one of (i) an operating system and (ii) a run time environment;
    (b) a device driver generation tool that generates said device driver for said hardware device;
    (c) a memory unit that stores (a) a database, and (b) a set of instructions; and
    (d) a processor that executes said set of instructions comprising:
        (i) dynamically querying said hardware device for a device programming specification;
        (ii) dynamically querying a run time environment for a run time specification;
        (iii) obtaining said device programming specification that is specific to said hardware device;

(iv) obtaining said run time specification that is specific to said hardware device and said run time environment;

(v) dynamically synthesizing a device driver by said device driver generation tool to obtain a synthesized device driver, wherein said device driver is specific to said hardware device and is generated based on said device programming specification and said run time specification;

(vi) automatically testing, by said device driver generation tool said synthesized device driver based on a device class of said hardware device; and (vii) automatically evaluating, by said device driver generation tool, at least one of: a performance of said synthesized driver with respect to standard performance parameters for said device class of said hardware device for validating functionality of said synthesized device driver and a quality of said synthesized device driver based on at least one of (a) a size of instructions associated with said device programming specification and said run time specification, and (b) a performance of said instructions.

11. The system of claim 10, wherein said set of instructions further comprises regenerating said synthesized device driver until no further errors are detected.

12. The system of claim 10, wherein said set of instructions further comprises generating a quality report of said synthesized device driver that is specific to said hardware device.

13. The system of claim 10, wherein said device programming specification is stored in said hardware device, and wherein said run time specification is stored in said run time environment of said computing device.

14. The system of claim 10, wherein said set of instructions further comprises obtaining a storage location of (a) said device programming specification based on a device ID and a vendor ID that is specific to said hardware device that are obtained from a configuration file, and (b) said run time specification based on said hardware device and said run time environment.

15. The system of claim 14, wherein said set of instructions further comprises obtaining
(a) said device programming specification, and (b) said run time specification from an external storage device that is in communication with said computing device.

16. The system of claim 10, wherein said set of instructions further comprises providing at least one uniform resource locator for downloading said device programming specification.

17. The system of claim 10, wherein said device programming specification and said run time specification are stored in at least one of (i) said computing device, (ii) said external storage device that is connected to said computing device, and (iii) a remote server that is in communication with said computing device.

18. A method of generating and validating a device driver for a hardware device, said method comprising:

(i) activating a boot code for a computing device, wherein said computing device comprises at least one of (i) an operating system, and (ii) a run time environment;

(ii) obtaining (a) information associated with at least one hardware device that is connected to said computing device, and (b) information associated with a hardware device for which a device driver is not present in said run time environment;

(iii) obtaining a device ID, and a vendor ID from a configuration file;

(iv) obtaining a storage location of (a) a device programming specification, and (b) a run time specification;

(v) dynamically querying (i) said hardware device for said device programming specification, and (ii) said run time environment for said run time specification;

(vi) obtaining said device programming specification that is specific to said hardware device;

(vii) obtaining said run time specification that is specific to said hardware device and said run time environment;

(viii) dynamically synthesizing a device driver, by a device driver generation tool, to obtain a synthesized device driver, wherein said device driver is specific to said hardware device and is generated based on said device programming specification and said run time specification;

(ix) testing, by said device driver generation tool, said synthesized device driver based on a device class of said hardware device; and (x) evaluating, by said device driver generation tool, at least one of: a performance of said synthesized driver with respect to standard performance parameters for said device class of said hardware device for validating functionality of said synthesized device driver and a quality of said synthesized device driver based on at least one of (a) a size of instructions associated with said device programming specification and said run time specification, and (b) a performance of said instructions.

19. A method of generating and validating a device driver for a hardware device, said method comprising:

(i) dynamically querying said hardware device for a device programming specification;

(ii) dynamically querying a run time environment for a run time specification;

(iii) obtaining said device programming specification that is specific to said hardware device;

(iv) obtaining said run time specification that is specific to said hardware device and said run time environment; and (v) dynamically synthesizing a device driver, by a device driver generation tool to obtain a synthesized device driver, wherein said device driver is specific to said hardware device and is generated based on said device programming specification and said run time specification; and (vi) automatically evaluating, by said device driver generation tool, at least one of: a performance of said synthesized driver with respect to standard performance parameters for said device class of said hardware device for validating functionality of said synthesized device driver and a quality of said synthesized device driver based on at least one of (a) a size of instructions associated with said device programming specification and said run time specification, and (b) a performance of said instructions.

* * * * *